US012783772B2

(12) United States Patent
Allmeling

(10) Patent No.: US 12,783,772 B2
(45) Date of Patent: Nov. 3, 2026

(54) METHOD AND APPARATUS FOR SIMULATING AN ELECTRICAL CIRCUIT, DIGITAL REAL-TIME SIMULATOR, COMPUTER PROGRAM AND COMPUTER-READABLE MEDIUM

(71) Applicant: Plexim GmbH, Zürich (CH)

(72) Inventor: Jost Allmeling, Kilchberg (CH)

(73) Assignee: Plexim GmbH, Zürich (CH)

( * ) Notice: Subject to any disclaimer, the term of this patent is extended or adjusted under 35 U.S.C. 154(b) by 786 days.

(21) Appl. No.: 18/328,147

(22) Filed: Jun. 2, 2023

(65) Prior Publication Data

US 2024/0070363 A1 Feb. 29, 2024

(30) Foreign Application Priority Data

Aug. 25, 2022 (EP) .................................... 22192232

(51) Int. Cl.
*G06F 30/367* (2020.01)
*G06F 119/06* (2020.01)

(52) U.S. Cl.
CPC ........ *G06F 30/367* (2020.01); *G06F 2119/06* (2020.01)

(58) Field of Classification Search
CPC ........................... G06F 30/367; G06F 2119/06
See application file for complete search history.

(56) References Cited

PUBLICATIONS

S. Alsarayreh and Z. Sütő, "Power Converter Half-bridge Models in the Light of Real-time FPGA Implementation," 2021 IEEE 19th International Power Electronics and Motion Control Conference (PEMC), Gliwice, Poland, 2021, pp. 153-160 (Year: 2021).*
Wang Keyou, et al., "A Generalized Associated Discrete Circuit Model of Power Converters in Real-Time Simulation" vol. 34, No. 3, Mar. 1, 2019, pp. 2220-2233.
Alsarayreh Saif, et al., "Power Converter Half-bridge Models in the Light of Real-time FPGA Implementation" Apr. 25, 2021, pp. 153-160.
Europen Search Report mailed Feb. 15, 2023 for EP Application No. 22192232.1.

* cited by examiner

*Primary Examiner* — Jack Chiang
*Assistant Examiner* — Aric Lin
(74) *Attorney, Agent, or Firm* — Renner, Otto, Boisselle & Sklar, LLP

(57) ABSTRACT

Disclosed is a method for simulating an electrical circuit, wherein the electrical circuit comprises at least one electrical switch, the at least one switch is modelled by an equivalent circuit comprising a fixed-value resistor and at least one of a controlled current source or a controlled voltage source, the at least one switch is able to attain an open state and a closed state, the open state is simulated by means of an open-state controller (OSC), wherein the open-state controller (OSC) is configured to control the current or voltage source and the open state controller comprises a filter, wherein the method comprises determining a current and/or voltage of the electrical circuit depending on the state of the at least one switch.

17 Claims, 8 Drawing Sheets

METHOD AND APPARATUS FOR SIMULATING AN ELECTRICAL CIRCUIT, DIGITAL REAL-TIME SIMULATOR, COMPUTER PROGRAM AND COMPUTER-READABLE MEDIUM

This application claims priority of European Patent Application No. 22192232.1 filed Aug. 25, 2022, which is hereby incorporated herein by reference in its entirety.

The invention relates to a method for simulating an electrical circuit. The invention further relates to an apparatus for simulating an electrical circuit. The invention further relates to a digital real-time simulator, a computer program and a computer-readable medium.

Electrical circuit simulation helps design engineers predict and analyze the behavior of an electrical device or system before a prototype is built. Simulation allows to create a model or virtual prototype for the device and perform tests under normal and faulty operating conditions. Since modifications to the model can be made quickly, simulation accelerates the development process and reduces time-to-market for new products.

A real-time simulator is a device that emulates the behavior of a physical system or apparatus with the same speed as the wall clock time. In other words, when the simulation clock reaches a certain time in a real-time simulation, the same time has elapsed in the real world. A digital real-time simulator contains a processing unit such as a CPU, GPU, FPGA to compute a mathematical model of the physical system. The model is usually expressed in the form of differential equations.

Real-time simulators usually feature high-speed digital and analog inputs and outputs (I/O) to which other technical equipment can be connected. Digital inputs can be used to read control signals. These signals can be, for example, pulses to drive the semiconductors in a switching power converter that is simulated in the real-time simulator. Voltage and current values calculated by the real-time simulator can be made accessible via the analog outputs.

Real-time simulators are increasingly employed to test and validate control equipment without a physical plant. The actual plant, i.e. the controlled system, is replaced by an appropriate dynamic model computed on the simulator. Since the control equipment is embodied as electronic hardware, this use case is referred to as hardware-in-the-loop (HIL) testing. HIL simulations allow testing both the control hardware and software in a safe environment.

When simulating an electrical circuit in real time, the small time constants and high dynamics of the electrical circuit pose challenges. To make the control equipment under test operate in the same way as when it is connected to a real power circuit, a real-time simulator must feature both high fidelity and low latency. This means, the simulation results must accurately represent the real voltages and currents in the electric circuit and need to be computed extremely fast. The output of the real-time simulator must reflect signal changes at the simulator input within few microseconds or less.

Figure 5:
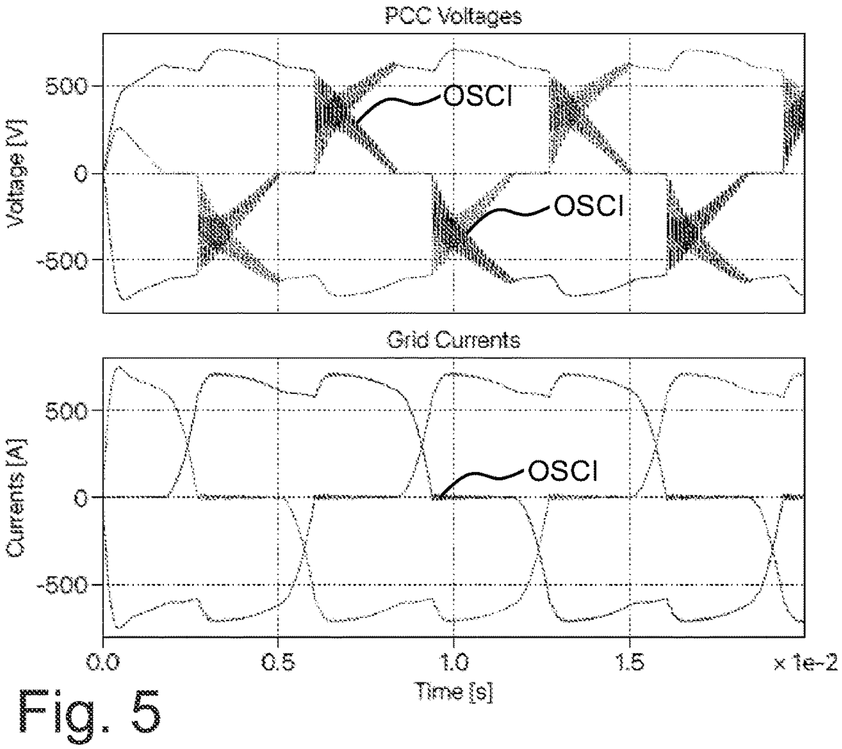

The objective of this invention is to contribute to an accurate simulation of an electrical circuit while maintaining a high simulation speed, especially to a simulation with less oscillations in comparison with other simulations as, for example, in comparison with the simulation shown in FIG. 5.

This objective is achieved by the features of the independent claims. Advantageous embodiments of the invention are given in the sub-claims.

In a first aspect, the invention is distinguished by a method for simulating an electrical circuit.

The electrical circuit comprises at least one electrical switch.

The electrical circuit may also comprise multiple electrical switches and other passive and/or active components, such as resistors, capacitors, inductors, transformers and/or any voltage and current sources.

The at least one switch is modelled by an equivalent circuit comprising a fixed-value resistor and at least one of a controlled current source or a controlled current voltage source. Thus, the equivalent circuit comprises a controlled current source or a controlled current voltage source or a combination of both.

The at least one switch is able to attain an open state and a closed state.

The closed state is equal to the switch being in a closed position, the open state is equal to the switch being in an open position.

The open state is simulated by means of an open-state controller, wherein the open-state controller is configured to control the current or voltage source and the open state controller comprises a filter.

The open-state controller may also comprise multiple filters, for example, 2 to 10, especially 4, 5 or 6.

The method comprises determining a current and/or voltage of the electrical circuit depending on the state of the at least one switch.

By means of the open-state controller the open state of the switch can be simulated with sufficient accuracy, while the required computing power is minimized and kept constant for all simulation steps, so that real-time simulation of complex electrical circuits is possible with both high fidelity and low latency. Due to the filter, spurious oscillations are minimized.

According to one embodiment an input of the open-state controller is based on a current or voltage determined in the electrical circuit. The current or voltage determined in the electrical circuit can also be named current or voltage measurement although it is not a real measurement as it is only an internal determination inside the simulation. Due to the internal measurement as a feedback signal, a closed control loop is formed which is stable and robust against external disturbances.

According to one embodiment the open-state controller is a discrete-time model.

The discrete-time model has especially a fixed simulation time step T, wherein T is, for example, in the range of 0.1 μs to 10 μs, especially 0.5 μs, 1 μs, or 2 μs.

According to one embodiment the filter is a low-pass filter or a band-pass filter.

Especially the use of a low-pass filter or a band-pass filter leads to a robust and sufficiently accurate simulation which minimizes spurious oscillations.

According to one embodiment the filter is a first-order filter.

By using a first-order filter, the required computing power is reduced, allowing very fast real-time simulation of complex electrical circuits.

According to one embodiment the open-state controller further comprises an integrator and the open-state controller output is the weighted sum of the integrator output and the filter output.

According to one embodiment the sum of all weights in the weighted sum is greater than zero and less than two.

If the sum is between 0 and 2, the simulation becomes stable irrespective of the remaining circuit and the choice of other parameters, so that a robust performance is achieved. The sum of all weights is preferably 1, or lies between 0.5 and 1.5.

According to one embodiment the open-state controller comprises multiple filters, and a smallest weight of the multiple filters and a largest weight of the multiple filters do not differ by more than a factor of two.

In order to attenuate oscillations over a wide frequency range, it is advantageous to use similar gains $k_m$ for all filters.

For example, the weights of the multiple filters are substantially the same, for example the weights are 1/(M+1), where M is the number of filters, wherein substantially means that the single weights may slightly differ from each other, for example by 5% or 10% or 20%.

According to one embodiment the open-state controller comprises multiple filters, and cutoff frequencies of the multiple filters are logarithmically distributed over a given frequency range.

In order to attenuate oscillations over a wide frequency range, it is advantageous to distribute the cutoff frequencies logarithmically across the frequency range of interest. Therefore, the damping coefficients of the filters may, for example, be determined according to the formula $1-\frac{1}{4}^{m}$ where m is an increment starting at 1 to M and M is the number of filters.

According to one embodiment the current and/or voltage is determined by means of at least one set of time-invariant equations.

According to one embodiment the current and/or voltage is determined using a discrete-time inversion-free solver with a fixed simulation time step T.

According to one embodiment the closed state is simulated by means of a closed-state controller and during the determining of the current and/or voltage a change-over between the open-state controller and the closed-state controller is performed based on an internal control signal.

Due to this, not only an electrical circuit with a switch in an open state can be simulated, but also the change to the switch in the closed state, and of course also the change back to the open state, so that the electrical circuit can be simulated in all states.

The internal control signal is a control signal generated inside the electrical circuit.

As an example, a diode is a switch that is controlled by internal control signals: The diode closes when the voltage across the diode measured from the anode to the cathode becomes positive. The diode opens when the measured current through the diode becomes negative.

According to one embodiment the closed state is simulated by means of a closed-state controller and during the determining of the current and/or voltage a change-over between the open-state controller and the closed-state controller is performed based on an external control signal.

Due to this, not only an electrical circuit with a switch in an open state can be simulated, but also the change to the switch in the closed state, and of course also the change back to the open state, so that the electrical circuit can be simulated in all states.

The external control signal is a control signal generated outside the electrical circuit.

For example, a MOSFET is a switch that is controlled by an external control signal: The MOSFET is in the closed state if and only if the external gate signal is active. Otherwise, the MOSFET is in the open state.

According to one embodiment the at least one electrical switch is a mechanical switch or a power semiconductor.

Mechanical switches comprise, for example, a circuit breaker and/or a contactor and/or a relay and/or a manual switch.

Power semiconductors comprise, for example, a diode, and/or a thyristor and/or a TRIAC (triode for alternating current) and/or a GTO (gate turn-off thyristor) and/or an IGCT (integrated gate-commutated thyristor) and/or an IGBT (insulated-gate bipolar transistor) and/or a MOSFET (metal-oxide-semi-conductor field-effect transistor).

In a further aspect, the invention is distinguished by a data processing apparatus comprising means for carrying out the method of the first aspect.

The above-described embodiments and advantages with regards to the method are also valid for the data processing apparatus.

In a further aspect, the invention is distinguished by a digital real-time simulator, wherein the digital real-time simulator comprises the data processing apparatus.

As described above, the real-time simulator is a device that emulates the behavior of a physical system or apparatus with the same speed as the wall clock time. In other words, when the simulation clock reaches a certain time in a real-time simulation, the same time has elapsed in the real world. The digital real-time simulator contains, for example, a processing unit such as a CPU, GPU, FPGA to compute a mathematical model of the physical system. The model is usually expressed in the form of differential equations.

The real-time simulator comprises, for example, high-speed digital and analog inputs and outputs (I/O) to which other technical equipment can be connected. The digital inputs can be used to read control signals. These signals can be, for example, pulses to drive the semiconductors in a switching power converter that is simulated in the real-time simulator. Voltage and current values calculated by the real-time simulator can be made accessible via the analog outputs.

The real-time simulator may be employed to test and validate control equipment without a physical plant. The actual plant, i.e. the controlled system, is replaced by an appropriate dynamic model computed on the real-time simulator. Since the control equipment is embodied as electronic hardware, this use case is referred to as hardware-in-the-loop (HIL) testing. HIL simulations allow testing both the control hardware and software in a safe environment.

The above-described embodiments and advantages with regards to the method are also valid for the digital real-time simulator.

In a further aspect, the invention is distinguished by a computer program comprising instructions which, when the program is executed by a computer, cause the computer to carry out the method of the first aspect.

In a further aspect, the invention is distinguished by a computer-readable medium comprising instructions which, when executed by a computer, cause the computer to carry out the method of any of the method of the first aspect.

Exemplary embodiments of the invention are explained in the following with the aid of schematic drawings.

Figure 1:
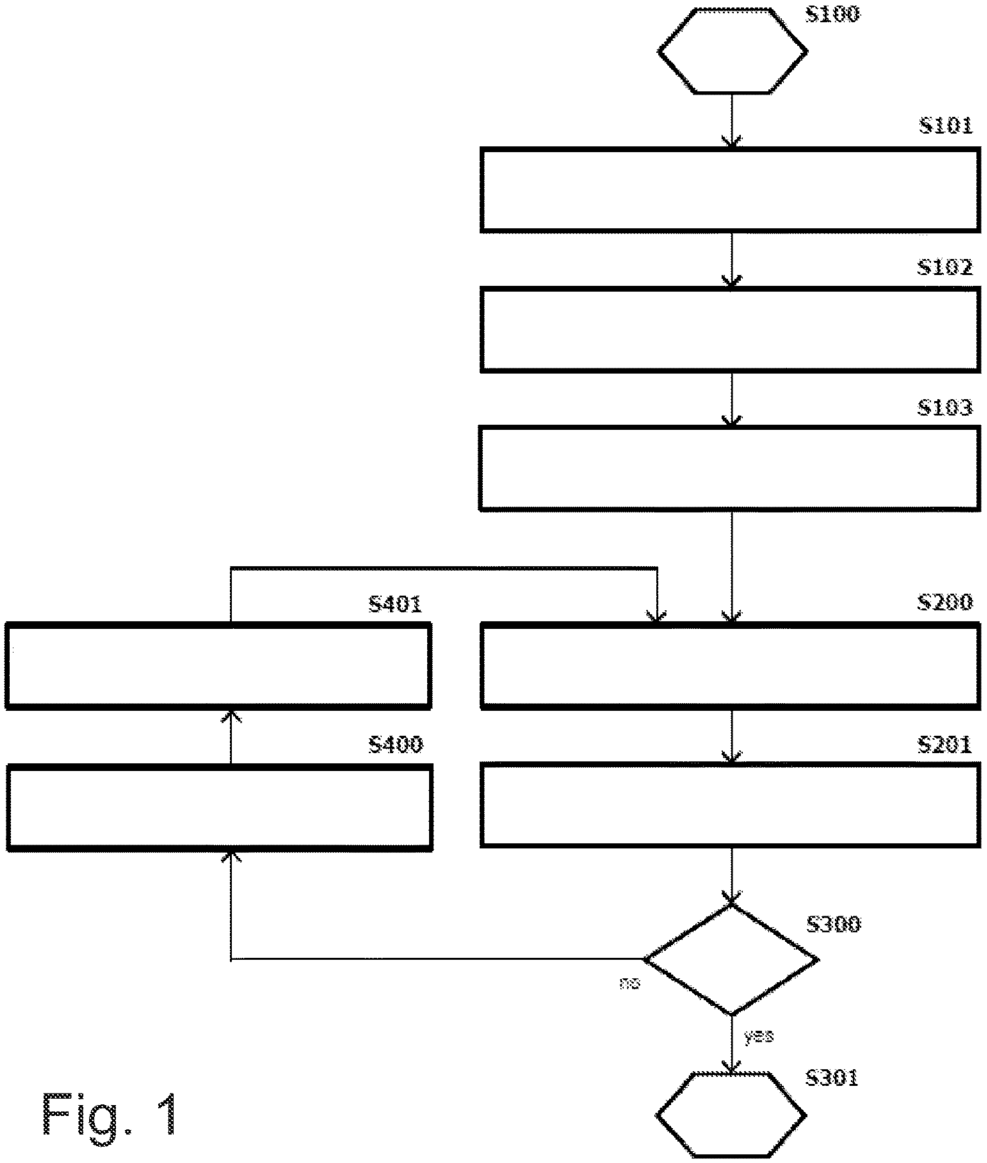
Figure 2:
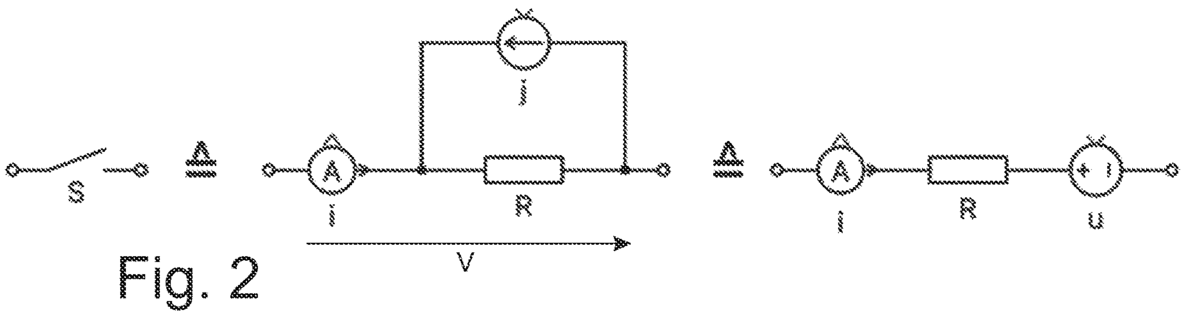
Figure 3:
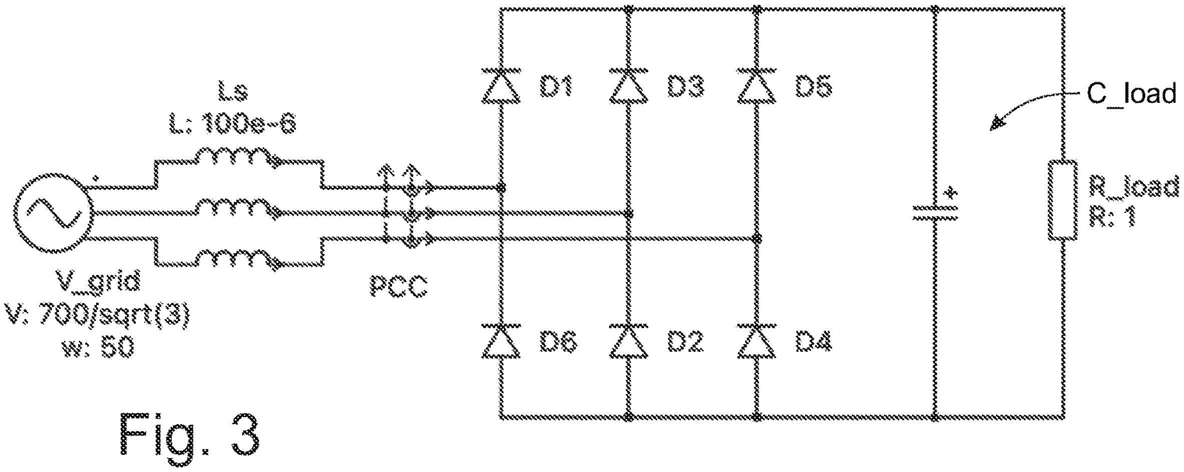
Figure 4:
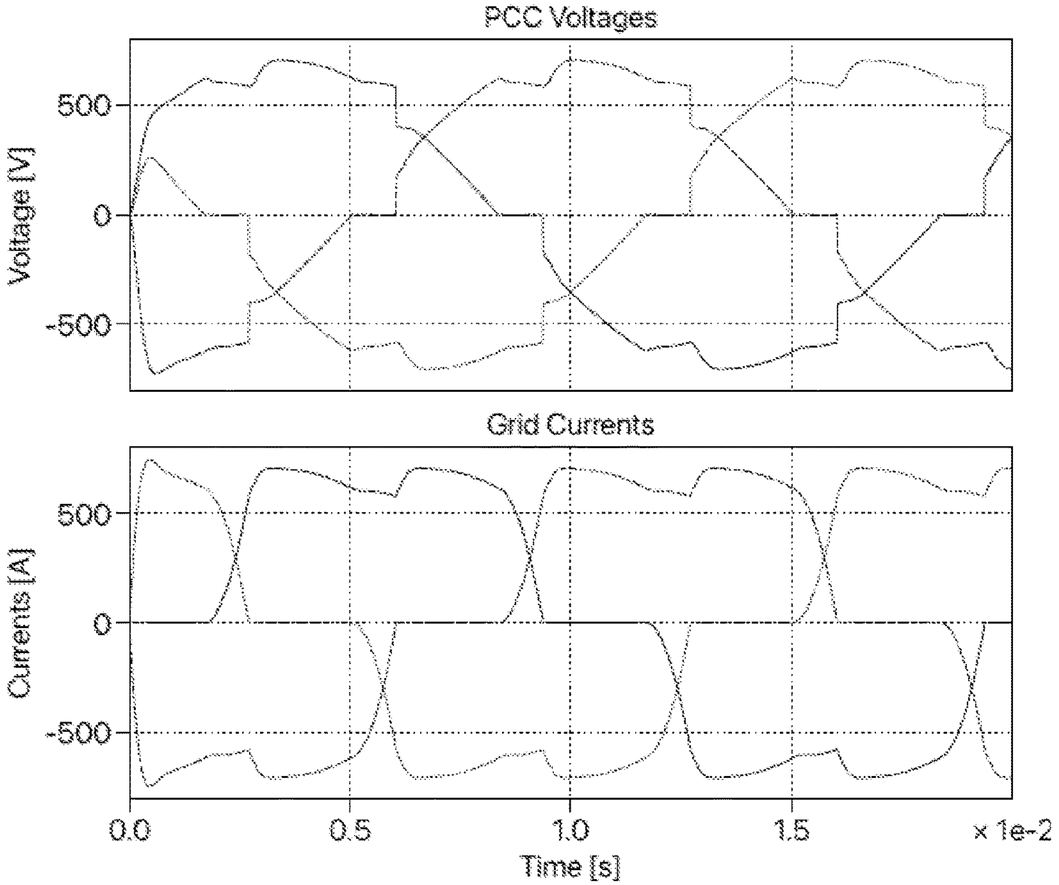
Figure 6:
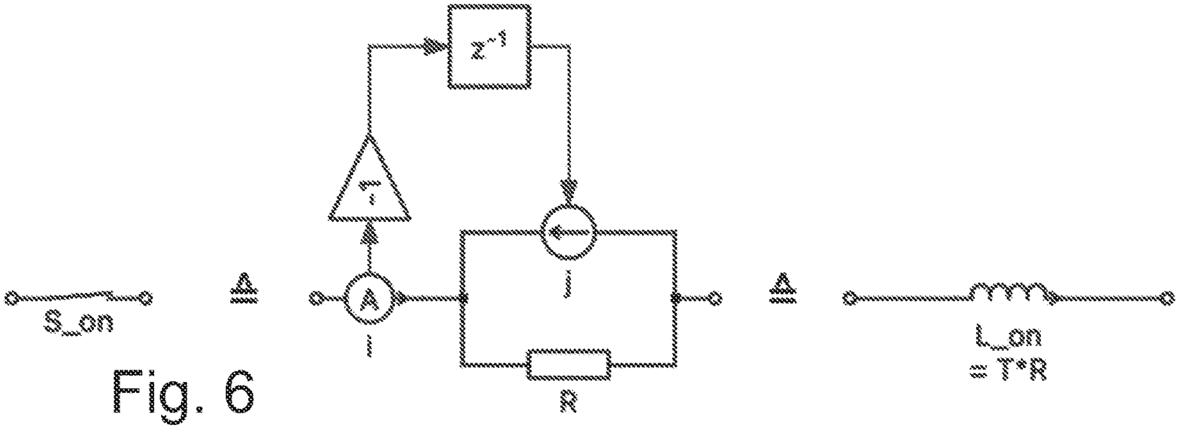
Figure 7:
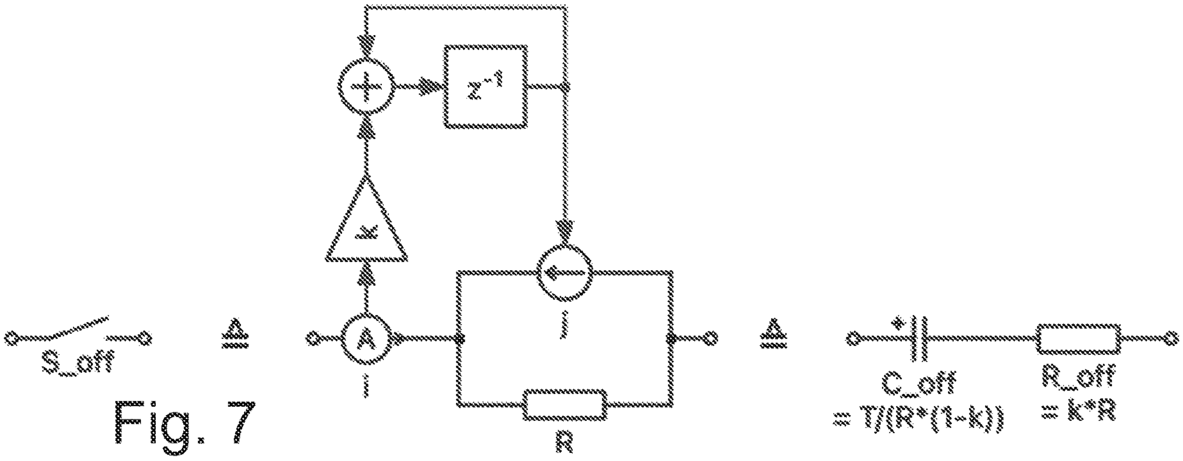
Figure 8:
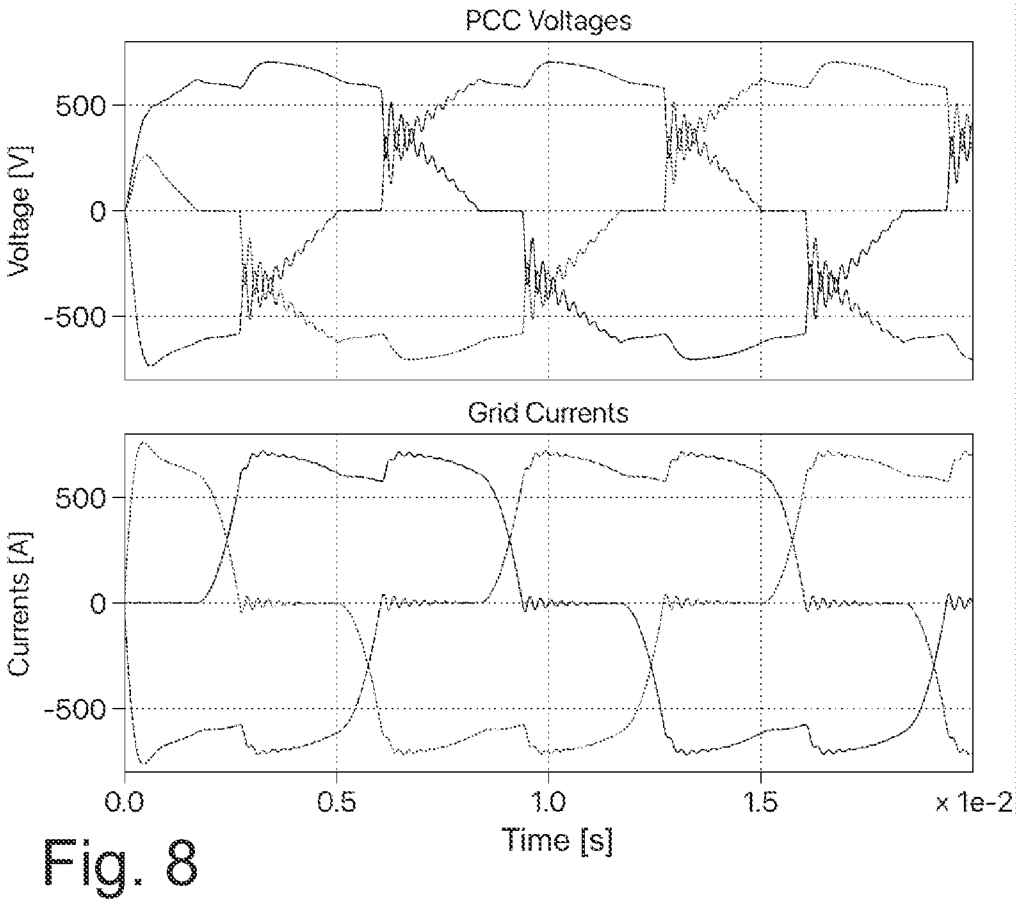
Figure 9:
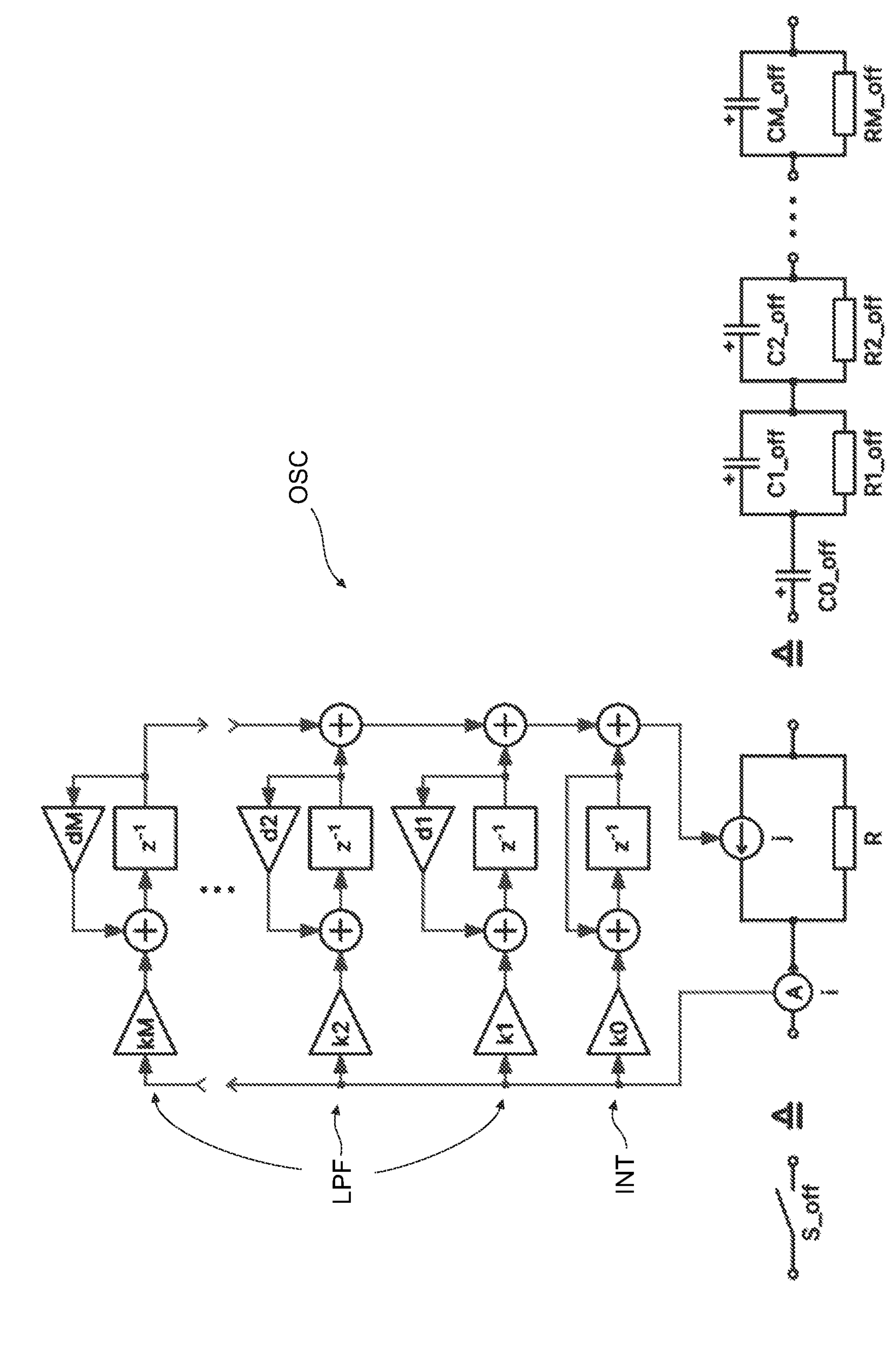
Figure 10:
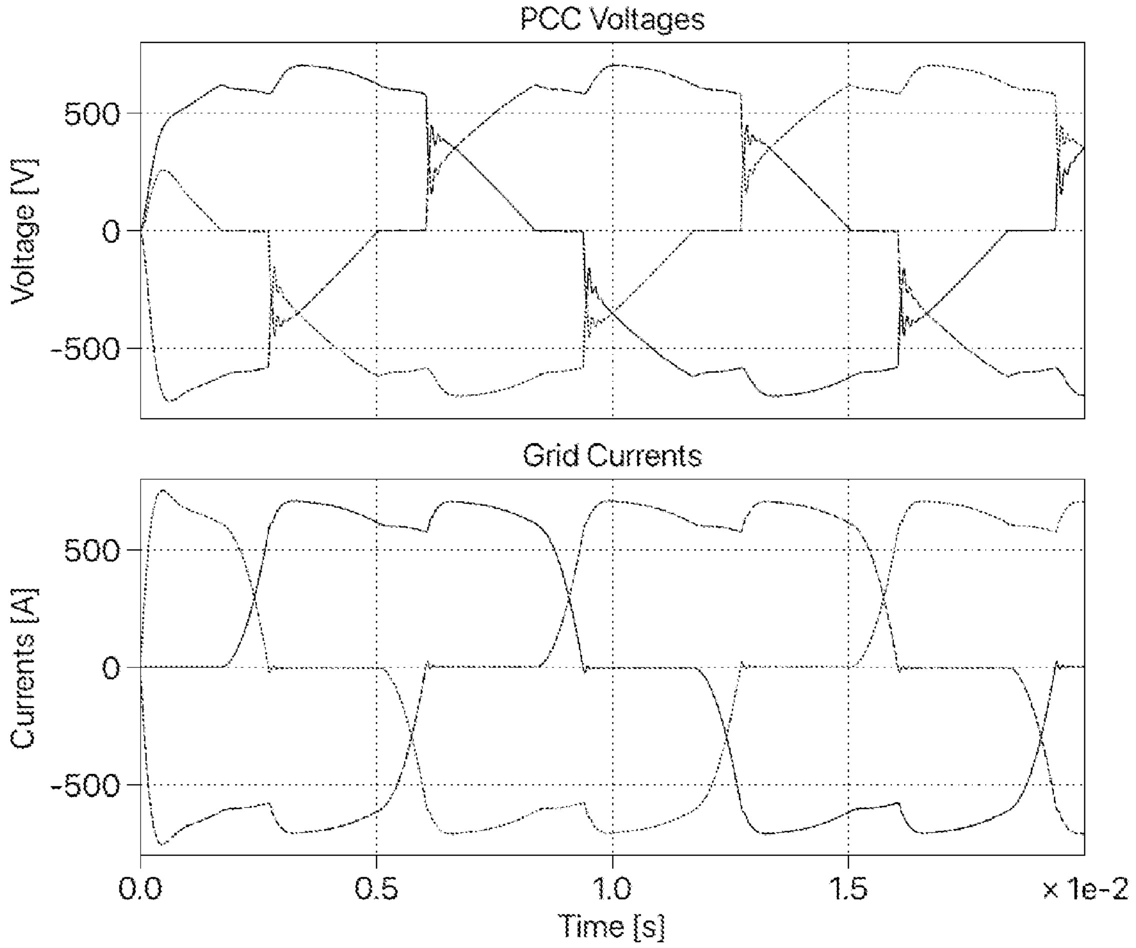
Figure 11:
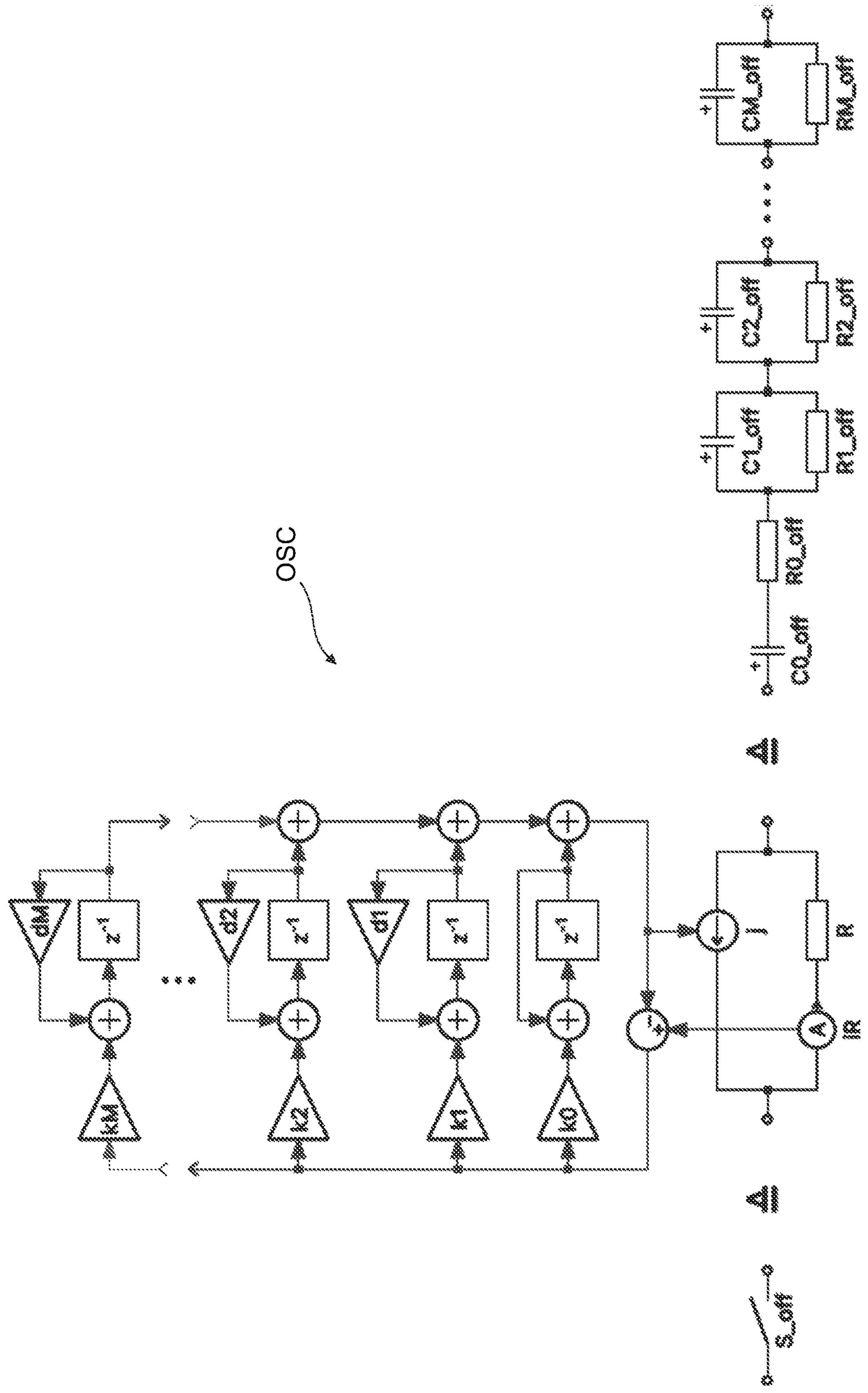

These are as follows:

FIG. 1 a flowchart for simulating an electrical circuit,

FIG. 2 a switch model,

FIG. 3 a three-phase diode rectifier,

FIG. 4 current and voltage waveforms,

FIG. 5 current and voltage waveforms,

FIG. 6 a switch model,

FIG. 7 a switch model,

FIG. 8 current and voltage waveforms,

FIG. 9 a switch model with an open state controller,

FIG. 10 current and voltage waveforms,

FIG. 11 a switch model with an open state controller, and

Figure 12:
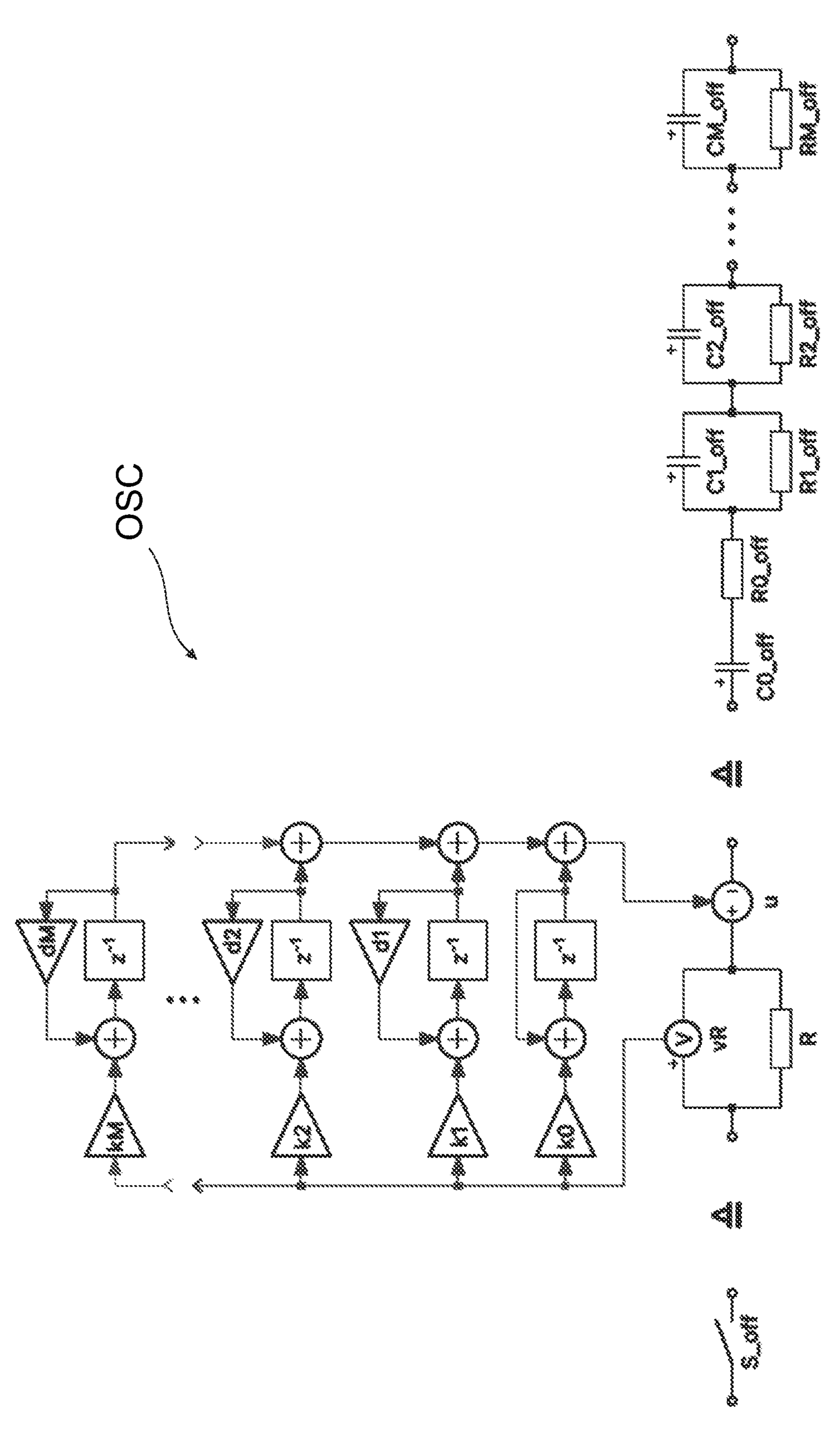

FIG. 12 a switch model with an open state controller.

Elements of same construction or type are described with the same reference signs throughout the figures.

FIG. 1 shows a flowchart of a program for simulating an electrical circuit. The program can be executed by a data processing apparatus.

The apparatus can be implemented, for example, in a computer comprising a processing unit, a program and/or data memory and one or more communication interfaces.

The computer can, for example, comprise a digital real-time simulator.

The digital real-time simulator contains a processing unit such as a CPU, GPU, FPGA to compute a mathematical model of the physical system.

In the method an electrical circuit is simulated. The electrical circuit comprises at least one electrical switch. The at least one switch is modelled by an equivalent circuit comprising a fixed-value resistor and a controlled current or voltage source. The at least one switch is able to attain an open state and a closed state. In the following it is also referred to switch states when referring to the open state or the closed state. The open state is simulated by means of an open-state controller, wherein the open-state controller is configured to control the current or voltage source and the open state controller comprises a filter.

Optionally the closed state is simulated by means of a closed-state controller, which for example, may be represented by a short circuit.

In a step S100 the program is started and, for example, the discretization time step T and the simulation end time are chosen. In the following the discretization time step T may also be named simulation time step T.

In a step S101, the at least one switch, especially multiple switches in the electrical circuit are replaced with associated discrete circuit (ADC) switch models. The ADC switch model comprises a fixed-value resistor connected in parallel to a controlled current source.

In a step S102, based on the electrical circuit, a set of differential equations is calculated that mathematically describe the electrical circuit.

In a step S103, variables such as inductor currents and capacitor voltages as well as switch states are initialized.

In a step S200, a simulation step is computed using the previously computed set of differential equations. A current and/or voltage of the electrical circuit depending on the state of the at least one switch is determined.

In a step S201, the simulation time is increased by the discretization time step T.

In a step S300 a decision is made to end the simulation, for example because the simulation end time has been reached, or to compute another simulation step.

In a step S400, the current switch state (open or closed) is determined for the at least one switch. The decision is based on internal measurements and/or external control signals.

In a step S401, the source current in the ADC model of the at least one switch is calculated depending on the switch state using either the open-state controller or the closed-state controller.

The sequence consisting of steps S200, S201, S300, S400 and S401 can be executed multiple times.

In a step S301 the program is stopped and can be started again in the step S100.

In the following, the open-state controller is explained in more detail.

Electrical circuits consisting of components such as resistors, capacitors, inductors, transformers, sources and meters can be mathematically expressed as a set of differential equations that accurately describe the dynamics of the circuit. If the circuit is linear, these equations are constant. They are calculated once before the simulation starts and are then valid for the entire simulation run.

Simulating power electronic circuits, however, is difficult because power semiconductors such as diodes, MOSFETs and IGBTs are non-linear components that exhibit sharp discontinuities when turned on and off. At the system level, the behavior of power semiconductors is best represented by ideal on/off switches. The switch state of each switch can be expressed by a variable s, where s=0 denotes an open switch and s=1 denotes a closed switch. The discontinuities resulting from toggling a switch are typically handled using a piece-wise linear representation, where each possible combination of switch states yields a different circuit topology and therefore requires a different set of equations. The current circuit topology is selected based on the control logic for the individual switches.

For each new topology encountered during a simulation, the circuit equations must be recalculated. Having N independent switches, the circuit could have 2^N (2 to the power of N) topologies. While in a desktop simulation the different sets of matrices are typically calculated on the fly when they are actually needed in the course of the simulation, this is not feasible in a real-time simulation. In a real-time simulation, the calculation of a time step should always require approximately the same amount of execution time and must be completed before the wall clock time has advanced by one simulation time step. As a consequence, all required matrices must be computed in advance and stored before the simulation is started. The memory requirement, which grows exponentially with the number of switches, limits the number N of switches in practice to less than a dozen.

One way to circumvent the large number of equation systems is to represent each power semiconductor not by an ideal switch, but by a fixed-value resistor R connected in parallel to a variable current source j as depicted in FIG. 2.

This implementation is referred to as associated discrete circuit (ADC) switch model. Alternatively, the switch S can be represented by a resistor R connected in series with a variable voltage source u. Since the resistor R is a linear component, the electrical circuit as a whole can be mathematically described as a fixed admittance matrix or as a single set of linear ordinary differential equations. The network equations can be solved using modified nodal analysis (MNA) or a state-space (SS) solver.

To make the resistor R in connection with the current source j behave like an ideal switch, the current source j should be controlled according to the following objectives: When the switch state is the open state (s=0), the steady-state current i through the switch shall be zero. When the switch state is the closed state (s=1), the voltage v across the switch shall be zero.

Digital real-time simulators typically employ discrete-time solvers with a fixed simulation time step T. To avoid an un-predictable number of iterations and thus fluctuating execution times, fast real-time simulators rely on explicit integration techniques. Explicit integration techniques do not use iteration to arrive at a solution. As a consequence, the execution times are fixed because the circuit equations are only evaluated once every simulation step.

In an iteration-free fixed-step solver, the computation of the source current $j_{n+1}$ at the new simulation step n+1 can only be based on measurements at previous simulation steps n or earlier.

It is assumed that for a small simulation time step $T=t_{n+1}-t_n$ the switch current and voltage do not change much between two consecutive simulation steps:

$$i_{n+1} \approx i_n \quad (1)$$

$$v_{n+1} \approx v_n \quad (2)$$

Based on this assumption, the following calculation rule is proposed to approximate the ideal switch characteristic.

$$j_{n+1} = \begin{cases} -i_n & \text{if } s_{n+1} = 1, \\ i_n + j_n & \text{if } s_{n+1} = 0. \end{cases} \quad (3)$$

If a switch is implemented with the rule suggested in Eqn. 3, the approximation makes a closed switch (short circuit) behave like a small inductance $$L_{on} = RT \quad (4)$$

and an open switch (open circuit) like a small capacitance $$C_{off} = T/R \quad (5)$$

with T being the discretization time step. However, in inductive networks, which are typical for power electronic circuits, the capacitance $C_{off}$ forms a resonator with the inductances in the circuit which leads to spurious oscillations, respectively unwanted overvoltages and overcurrents. The above assumptions can also be applied to multiple switches.

As an example, let us consider a three-phase diode rectifier D1-D6 with a capacitive dc load C load shown in FIG. 3. FIG. 4 shows current and voltage waveforms at the point of common coupling (PCC) of the three-phase network obtained from a desktop simulation with diodes D1-D6 modeled as ideal instantaneous switches.

FIG. 5 shows the simulation result if an approximate switch model according to Eqn. 3 with R=1Ω and a fixed simulation time step of 1 μs is used. It can be seen that the voltages and currents are distorted by oscillations OSCI.

In order to reduce spurious oscillations and power losses, various optimization techniques can be applied to tune the ADC switch parameters for a selected circuit.

It is possible to reduce oscillations further by making the switch in the off-state behave like a series-connected $R_{off}C_{off}$ circuit instead of a pure capacitor $C_{off}$. In this approach, only a fraction k of the resistor R is used to represent the equivalent capacitor $C_{off}$ $$C_{off} = T/(kR) \quad (6)$$

while the remainder is used for damping purposes:

$$R_{off} = (1-k)R \quad (7)$$

The update rule from Eqn. 3 is hence modified as $$j_{n+1} = \begin{cases} -i_n & \text{if } s_{n+1} = 1, \\ ki_n + j_n & \text{if } s_{n+1} = 0. \end{cases} \quad (8)$$

with the gain k∈(0,1].

FIG. 6 illustrates the implementation of a switch S in the closed state, which may also be named on-state, using the update rule from Eqn. 8.

FIG. 7 illustrates the implementation of a switch S in the open state, which may also be named off-state, using the update rule from Eqn. 8. The unit delay z^−1 is referred to the simulation time step T. Both FIGS. 6 and 7 also show the equivalent electrical circuit.

FIG. 8 shows the simulation result for the diode rectifier using approximate switch models according to Eqn. 8 with k=0.2. All other parameters correspond to those used for FIG. 4. Thanks to the damping, the magnitude of the excited oscillations decays faster than in FIG. 5. However, since 80% of the resistance R is already used for damping purposes, a significantly higher damping cannot be achieved without increasing the value of R. Another effect of the damping is that the equivalent capacitance $C_{off}$ has become 5 times larger than before. This shifts the oscillations to lower frequencies where they are more difficult to mitigate with a low-pass filter. With this approach, damping and oscillation frequencies can only be adjusted within a small range and not independently of each other.

In order to further reduce the spurious oscillations, a new high order update rule is proposed here for controlling the current source when the switch is in off-state. The discrete integrator $j_{n+1}=k\ i_n+j_n$ from Eqn. 8 is augmented with the described open state controller OSC.

One implementation of the open-state controller OSC comprises a parallel connection of an integrator INT and low-pass filters LPF with different cut-off frequencies as illustrated in FIG. 9. The electrical behavior of the switch in off-state now corresponds to a capacitance $C_{0,off}$ connected in series with capacitors $C_{m,off}$ individually connected in parallel to resistors $R_{m,off}$.

The gains $k_m$ of the integrator INT and the individual low-pass filters LPF determine the size of the capacitors $C_{m,off}$ in the equivalent circuit:

$$C_{m,off} = \frac{T}{k_m R} \quad (9)$$

For stability reasons, it is advantageous if the sum of all gains is between 0 and 2:

$$\sum_{m=0}^{M} k_m \in (0, 2) \quad (10)$$

For a good performance independent of the remaining circuit configuration, it is advantageous that the sum of all gains is in the range of 1:

$$\sum_{m=0}^{M} k_m \approx 1 \quad (11)$$

The values of the resistors $R_{m,off}$ in the equivalent circuit can be calculated from the damping coefficients dm as $$R_{m,off} = k_m R \frac{d_m}{1 - d_m} \tag{12}$$

The cut-off frequencies $\omega_m$ of the individual low-pass filters are hence:

$$\omega_m = \frac{1}{T}\left(\frac{1}{d_m} - 1\right) \tag{13}$$

In order to attenuate oscillations over a wide frequency range, it is advantageous to distribute the cutoff frequencies $\omega_m$ logarithmically across the frequency range of interest and to use similar gains $k_m$ for all filters.

As an example, the update rule has been configured with the parameters listed in Tab. 1.

| m | $k_m$ | $d_m$ |
|---|---|---|
| 0 | 0.2 | — |
| 1 | 0.2 | 1 − 1/4 |
| 2 | 0.2 | 1 − 1/16 |
| 3 | 0.2 | 1 − 1/64 |
| 4 | 0.2 | 1 − 1/256 |

The simulation results with a simulation time step T=1 μs are shown in FIG. 10. It can be clearly be seen that the spurious oscillations are significantly reduced compared to the implementations previously presented. In contrast the other optimization techniques, this new update rule realized by the open-state controller does not need to be adapted to a particular circuit and is robust against parameter variations.

FIG. 11 shows another implementation of the open-state controller. The open-state controller of FIG. 11 is essentially corresponding to the open-state controller described above with respect to FIG. 9. The only difference is, that the current measurement for the input of the open-state controller is located in series with the resistor R.

FIG. 12 shows another implementation of the open-state controller. The open-state controller of FIG. 12 is essentially corresponding to the open-state controller described above with respect to FIG. 9. The difference is, that instead of a current measurement a voltage measurement is used for the input of the open-state controller which is located in parallel with the resistor R. Further, the output of the open-state controller controls a voltage source which is connected in series with the voltage measurement and the resistor.

I claim:

1. A Method for simulating an electrical circuit, wherein the electrical circuit comprises at least one electrical switch, the at least one switch is modelled by an equivalent circuit comprising a fixed-value resistor and at least one of a controlled current source or a controlled voltage source, the at least one switch is able to attain an open state and a closed state, the at least one switch is able to attain an open state and a closed state, the open state is simulated by means of an open-state controller (OSC), wherein the open-state controller (OSC) is configured to control the current or voltage source and the open state controller (OSC) comprises a filter (LPF), wherein the open-state controller (OSC) further comprises an integrator (INT) and the open-state controller (OSC) output is the weighted sum of the integrator (INT) output and the filter (LPF) output, wherein the method comprises determining a current and/or voltage of the electrical circuit depending on the state of the at least one switch.

2. The method of claim 1, wherein an input of the open-state controller (OSC) is based on a current or voltage determined in the electrical circuit.

3. The method of claim 1, wherein the open-state controller is a discrete-time model.

4. The method of claim 1, wherein the filter (LPF) is a low-pass filter or a band-pass filter.

5. The method of claim 4, wherein the filter (LPF) is a first-order filter.

6. The method of claim 1, wherein the sum of all weights in the weighted sum is between zero and two.

7. The method of claim 1, wherein the open-state controller (OSC) comprises multiple filters (LPF) and a smallest weight of the multiple filters (LPF) and a largest weight of the multiple filters does not differ by more than a factor of two.

8. The method of claim 1, wherein the open-state controller comprises multiple filters (LPF) and cutoff frequencies of the multiple filters are logarithmically distributed over a given frequency range.

9. The method of claim 1, wherein the current and/or voltage is determined by means of at least one set of time-invariant equations.

10. The method of claim 1, wherein the current and/or voltage is determined using a discrete-time inversion-free solver with a fixed simulation time step T.

11. The method of claim 1, wherein;

the closed state is simulated by means of a closed-state controller, during the determining of the current and/or voltage a change-over between the open-state controller and the closed-state controller is performed based on an internal control signal.

12. The method of claim 1, wherein;

the closed state is simulated by means of a closed-state controller, during the determining of the current and/or voltage a change-over between the open-state controller and the closed-state controller is performed based on an external control signal.

13. The method of claim 1, wherein the at least one electrical switch is a mechanical switch or a power semiconductor.

14. A digital real-time simulator, wherein the digital real-time simulator comprises the data processing apparatus according to claim 13.

15. A data processing apparatus comprising means for carrying out the method of claim 1.

16. A computer program comprising instructions which, when the program is executed by a computer, cause the computer to carry out the method of claim 1.

17. A computer-readable medium comprising instructions which, when executed by a computer, cause the computer to carry out the method of claim 1.

* * * * *